United States Patent
Lim

(10) Patent No.: US 8,671,788 B2
(45) Date of Patent: Mar. 18, 2014

(54) POWER TRANSMITTING APPARATUS

(75) Inventor: Sun Ho Lim, Bucheon-si (KR)

(73) Assignee: Sejin-IGB Co., Ltd. (KR)

( * ) Notice: Subject to any disclaimer, the term of this patent is extended or adjusted under 35 U.S.C. 154(b) by 45 days.

(21) Appl. No.: 13/377,341

(22) PCT Filed: May 4, 2010

(86) PCT No.: PCT/KR2010/002826
§ 371 (c)(1),
(2), (4) Date: Dec. 9, 2011

(87) PCT Pub. No.: WO2010/143813
PCT Pub. Date: Dec. 16, 2010

(65) Prior Publication Data
US 2012/0174690 A1  Jul. 12, 2012

(30) Foreign Application Priority Data

Jun. 10, 2009 (KR) .................. 10-2009-0051656

(51) Int. Cl.
*F16H 29/20* (2006.01)
*F16H 27/02* (2006.01)

(52) U.S. Cl.
USPC .................................................. 74/89.11

(58) Field of Classification Search
USPC ......... 74/422, 89.11, 89.12, 89.17, 89.18, 29, 74/465, 462
See application file for complete search history.

(56) References Cited

U.S. PATENT DOCUMENTS

| | | | |
|---|---|---|---|
| 1,140,427 A | 5/1915 | Wilson | |
| 4,573,373 A * | 3/1986 | Shimizu et al. | 74/468 |
| 4,669,328 A * | 6/1987 | Kishi et al. | 74/422 |
| 5,470,286 A * | 11/1995 | Fan | 475/331 |
| 5,540,111 A * | 7/1996 | Barnett et al. | 74/30 |
| 5,794,876 A * | 8/1998 | Morizane et al. | 242/374 |

(Continued)

FOREIGN PATENT DOCUMENTS

| | | |
|---|---|---|
| DE | 10225823 | 1/2004 |
| FR | 808629 | 7/1936 |

(Continued)

OTHER PUBLICATIONS

European Search Report—European Application No. 10786296.3 issued on Feb. 25, 2013, citing JP6229427, DE10225823, GB220032, JP2000346178, US 1140427, GB19772 and FR808629.
International Search Report—PCT/KR2010/002826 dated Jan. 5, 2011.

*Primary Examiner* — Ha D Ho
*Assistant Examiner* — Jude Agendia
(74) *Attorney, Agent, or Firm* — Cantor Colburn LLP

(57) ABSTRACT

Disclosed is a power-transmitting apparatus The power-transmitting apparatus of the present invention comprises: a pin gear provided with a plurality of pins capable of rolling movement; a spur gear provided with a plurality of teeth and engagingly coupled to the pin gear so as to be relatively movable; and a lubricant supplying unit provided on the pin gear to supply lubricant to the plurality of pins. According to the present invention, by regularly applying a lubricant, the occurrence of problems such as the adherence of external dust and the efflorescence of the lubricant can be reduced, and in particular, because lubricant can be self-supplied to the plurality of pins provided on the pin gear, as opposed to the prior art, the task of applying a lubricant can be easily performed.

14 Claims, 7 Drawing Sheets

(56) References Cited

U.S. PATENT DOCUMENTS

| | | | |
|---|---|---|---|
| 6,023,989 A * | 2/2000 | Imase et al. | 74/422 |
| 6,039,667 A * | 3/2000 | Schunck et al. | 475/159 |
| 7,472,640 B2 * | 1/2009 | Maffeis | 92/136 |
| 7,686,734 B2 * | 3/2010 | Mordukhovich et al. | 475/331 |
| 7,794,355 B2 * | 9/2010 | Pusateri | 475/331 |
| 2006/0243074 A1 * | 11/2006 | Bieg et al. | 74/89.18 |
| 2010/0000358 A1 * | 1/2010 | Paluncic et al. | 74/468 |
| 2010/0101352 A1 * | 4/2010 | Paluncic et al. | 74/467 |

FOREIGN PATENT DOCUMENTS

| | | |
|---|---|---|
| GB | 19772 | 0/1915 |
| GB | 220032 | 8/1924 |
| JP | 06229427 | 8/1994 |
| JP | 10-184842 | 7/1998 |
| JP | 11-210986 | 8/1999 |
| JP | 2000346178 | 12/2000 |
| JP | 2005-076685 | 3/2005 |

* cited by examiner

POWER TRANSMITTING APPARATUS

TECHNICAL FIELD

The present invention relates to a power transmitting apparatus, and more particularly, to a power transmitting apparatus in which the occurrence of problems such as adherence of external dust and efflorescence of a lubricant due to regular application of the lubricant may be reduced, and in particular, as opposed to a related art, a lubricant coating work may be made easy because the lubricant can be self-supplied to a plurality of pins provided on a pin gear.

BACKGROUND ART

A power transmitting apparatus is largely divided into a rack and pinion for converting a rotational motion to a linear motion or vice versa and a gear train for transmitting only a rotational motion while converting a rotational speed and a torque.

Typically, a power transmitting system of a power transmitting apparatus mainly uses a tooth shape according to an involute curve principle. However, there is a rare case of using a tooth shape according to a cycloid curve principle and a pin gear.

No matter what tooth is used, lubrication of a contact tooth surface is essential in the power transmitting apparatus. In particular, when a pre-pressure is applied to a tooth surface in order to improve a degree of precision or rigidity, a large amount of friction is generated on the tooth surface so that importance of lubrication is further emphasized.

The lubrication may be essential not only for a rack and pinion for converting a rotational motion to a linear motion or a linear motion to a rotational motion, but also for a portion where a driving gear and a driven gear are engaged with each other, such as, a section gear, a large index, or a large positioner needing a circular motion of a large diameter.

In a related art, for supply of a lubricant, a lubrication method of entirely surrounding a gear train by a housing and performing an oil leak prevention treatment using an oil seal or an O-ring and then filling the inside of the housing with the lubricant, or an oil bath lubrication method, has been selected.

However, it is a problem that this method is difficult to apply because an increase of self-weight and deterioration of efficiency due to viscosity friction of a lubricant, particularly in a case of a large gear train.

In the meantime, for a rack and pinion and a section gear, since these are not a gear train performing a complete circular motion and the gear train is exposed to the outside, there has been no special method other than a method of regularly coating a lubricant having a high viscosity. When the lubricant is regularly coated, maintenance and repair is needed due to the adherence of external dust and efflorescence of a lubricant. Furthermore, a lubrication work becomes inconvenient and difficult. Therefore, a solution to address the above matters is needed.

DISCLOSURE OF INVENTION

Technical Problem

The present invention provides a power transmitting apparatus in which the occurrence of problems such as adherence of external dust and efflorescence of a lubricant due to regular application of the lubricant may be reduced, and in particular, as opposed to a related art, a lubricant coating work may be made easy because the lubricant can be self-supplied to a plurality of pins provided on a pin gear.

Advantageous Effects

According to the present inventive concept, provides a power transmitting apparatus in which the occurrence of problems such as adherence of external dust and efflorescence of a lubricant due to regular application of the lubricant may be reduced, and in particular, as opposed to a related art, a lubricant coating work may be made easy because the lubricant can be self-supplied to a plurality of pins provided on a pin gear.

BEST MODE FOR CARRYING OUT THE INVENTION

Figure 1:
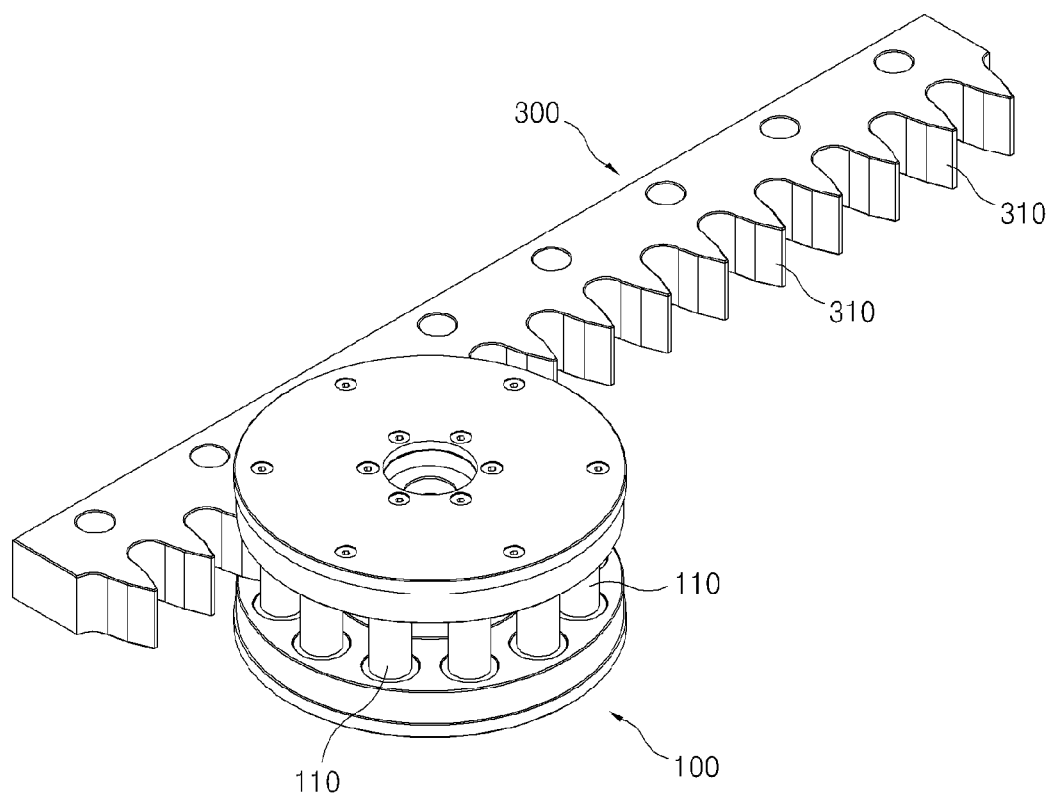
FIG. 1 is a perspective view of a power transmitting apparatus according a first embodiment of the present invention.

According to an aspect of the present invention, a power transmitting apparatus includes a pin gear provided with a plurality of pins capable of performing a rolling motion, a tooth gear provided with a plurality of teeth and engagingly coupled to the pin gear so as to be relatively movable, and a lubricant supplying unit provided on the pin gear to supply a lubricant to the plurality of pins.

The pin gear may be a pinion-type driving gear and the tooth gear may be a rack-type driven gear.

The pin gear may include first and second circular plates arranged separated from and parallel to each other, with the plurality of pins provided therebetween at the same interval in a circumferential direction, first and second circular caps respectively coupled to exposed surfaces of the first and second circular plates, and a plurality of coupling members coupling the first and second circular caps and the first and second circular plates.

The pin gear may further include a plurality of pin support bearings coupled to the first and second circular plates and supporting both end portions of each of the plurality of pins so as to be capable of performing a rolling motion.

The lubricant supplying unit may include a lubricant storage provided in each of the plurality of pins and storing a lubricant, a lubricant ejection hole formed in a lateral surface of each of the plurality of pins to communicate with the lubricant storage and ejecting the lubricant in the lubricant storage to the outside of each of the plurality of pins, and a lubricant supplying portion provided in any one of the first and second circular caps and supplying the lubricant to the lubricant storage of each of the plurality of pins.

The lubricant supplying portion may be formed in a concave form in an inner surface of the any one circular cap and have a radial structure in which a cross section thereof is gradually decreased toward the outside in a radial direction.

The lubricant ejection hole may be provided at two positions symmetrically in one of the plurality of pins in a lengthwise direction.

The lubricant supplying unit may further include a plurality of balls having a size relatively larger than the lubricant ejection hole and arranged at both end portions of each of the plurality of pins to reduce a frictional area of the pin.

The tooth gear may have a curved shape and the pin gear may be partially inscribed or circumscribed on the tooth gear.

The pin gear may be a rack-type driven gear and the tooth gear may be a pinion-type driving gear.

The pin gear may include a gear main body to which the plurality of pins are linearly coupled at an equal interval, and a bushing coupled to the outside of each of the plurality of pins.

The lubricant supplying unit may include a lubricant storage provided in the plurality of pins and storing a lubricant, and at least one lubricant ejection hole formed in an outer surface of each of the plurality of pins to communicate with the lubricant storage and ejecting the lubricant in the lubricant storage to the outside between the plurality of pins and the bushing.

The lubricant supplying unit may further include a lubricant groove radially and inwardly formed in an area where the lubricant ejection hole is formed along a circumferential direction of each of the plurality of pins.

The lubricant supplying unit may further include a cap detachably coupled to an opening portion at one side of the lubricant storage.

According to another aspect of the present invention, a power transmitting apparatus includes a plurality of pin gears, each pin gear comprising a plurality of pins capable of performing a rolling motion, a first tooth gear arranged outside the plurality of pin gears and on which the pins of the pin gears are inscribed, a second tooth gear arranged inside the first tooth gear and on which the pins of the pin gears are circumscribed, and a lubricant supplying unit provided on the plurality of pin gears to supply a lubricant to the plurality of pins.

MODE FOR INVENTION

Reference will now be made in detail to embodiments, examples of which are illustrated in the accompanying drawings, wherein like reference numerals refer to the like elements throughout.

Figure 2:
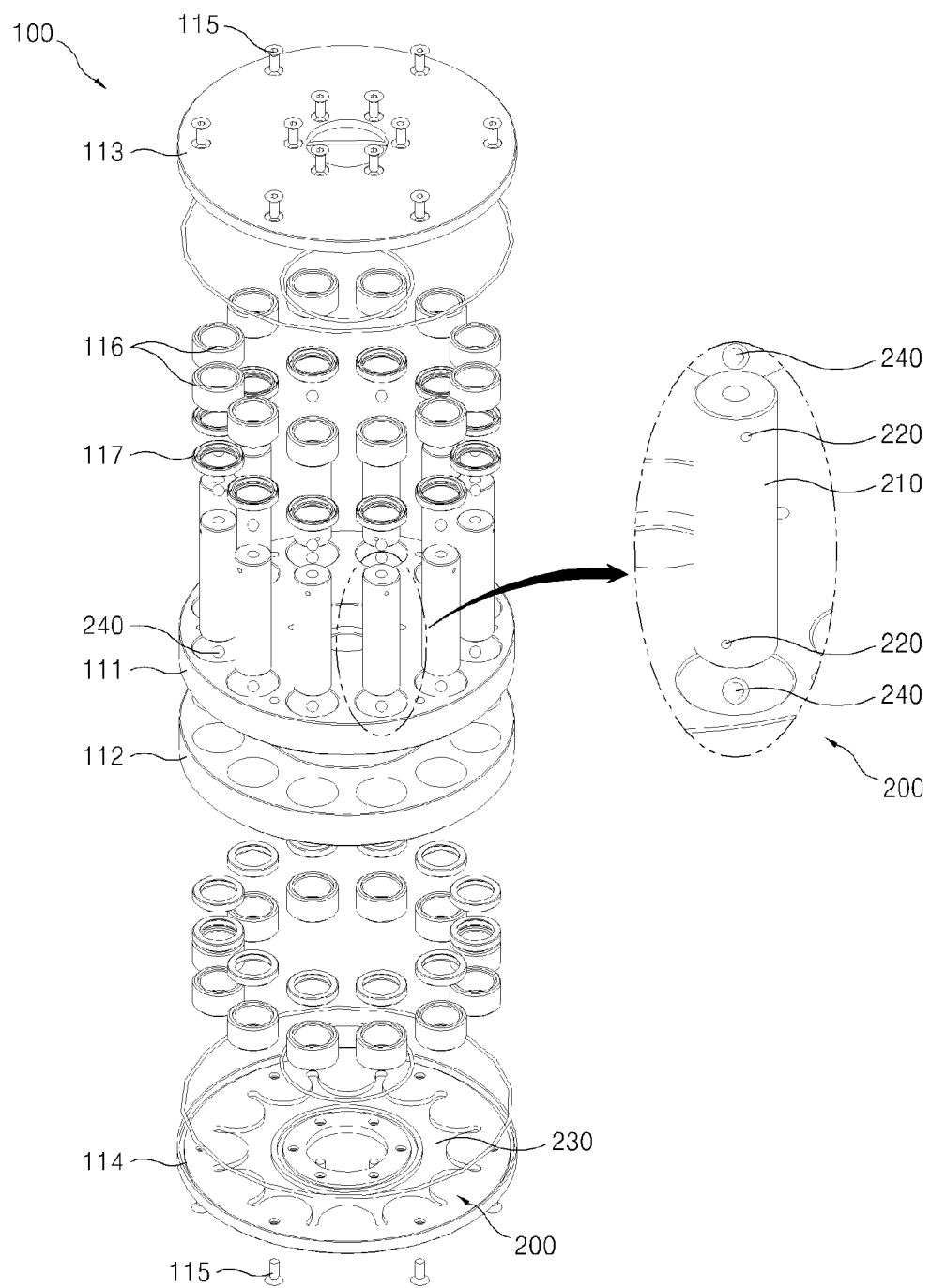
FIG. 2 is an exploded perspective view of the pin gear of FIG. 1.

FIG. 1 is a perspective view of a power transmitting apparatus according a first embodiment of the present invention. FIG. 2 is an exploded perspective view of the pin gear of FIG. 1.

Referring to FIGS. 1 and 2, a power transmitting apparatus according to the present embodiment includes a pin gear 100 having a plurality of pins 110 capable of performing a rolling motion, a tooth gear 300 having a plurality of teeth 310 and engagingly coupled to the pin gear 100 to be capable of relatively moving, and a lubricant supplying unit 200 provided in the pin gear 100 to supply a lubricant to the pins 110.

In the present embodiment, the pin gear 100 is a pinion-type driving gear and the tooth gear 300 is a rack-type driven gear. That is, as the pin gear 100 to which a motor (not shown) is connected performs a rotational motion, the tooth gear 300 engaged with the pin gear 100 performs a linear motion, thereby forming a power transmitting system. However, the right scope of the present invention is not limited thereto and a reverse case may be available.

Referring to FIG. 2, in the structure of the pin gear 100, the pin gear 100 includes first and second circular plates 111 and 112 arranged separated from and parallel to each other, with the pins 110 provided therebetween at the same interval in a circumferential direction, first and second circular caps 113 and 114 respectively coupled to exposed surfaces of the first and second circular plates 111 and 112, a plurality of coupling members 115 coupling the first and second circular caps 113 and 114 and the first and second circular plates 111 and 112, and a plurality of pin support bearings 116 coupled to the first and second circular plates 111 and 112 and supporting both end portions of each of the pins 110 to be capable of performing a rolling motion.

In the present embodiment, since twelve pins are provided as the pins 110 at an equiangular interval in the circumferential direction, twelve pin support bearings are accordingly provided as the pin support bearings 116. A plurality of oil seals 117 are further provided between the pin support bearings 116 and the pins 110.

The lubricant supplying unit 200 includes a lubricant storage 210 provided in each of the pins 110 and storing a lubricant, a lubricant ejection hole 220 formed in a lateral surface of each of the pins 110 to communicate with the lubricant storage 210 and ejecting the lubricant in the lubricant storage 210 to the outside of each of the pins 110, and a lubricant supplying portion 230 provided in the second circular cap 114 and supplying the lubricant to the lubricant storage 210 of each of the pins 110.

The lubricant storage 210 refers to an inner space of each of the pins 110 for storing the lubricant. Accordingly, the lubricant storage 210 may be the inner space of each of the pins 110 itself or have a separate pouch shape separately provided in the inner space of each of the pins 110 to store the lubricant.

The lubricant ejection hole 220 is a place to eject the lubricant stored in the inside of each of the pins 110 to the outside of each of the pins 110. As it is illustrated in FIG. 2, in the present embodiment, the lubricant ejection hole 220 is provided at two different positions in a single pin as each of the pins 110. Of course, since this is merely one of various embodiments, the lubricant ejection hole 220 is not necessarily provided at two positions.

However, when the lubricant ejection hole 220 is provided at two positions symmetrically with respect to a lengthwise direction of each of the pins 110, it is a merit that the lubricant is smoothly ejected during a rolling motion of each of the pins 110.

The lubricant supplying portion 230 is formed in a concave form in an inner surface of the second circular cap 114 and has a radial structure in which a cross section thereof is gradually decreased toward the outside in a radial direction. The lubricant supplying portion 230 supplies the lubricant directly to the pins 110 that are rolling elements performing a rolling motion and the pin support bearings 116.

The lubricant is supplied to the pins 110 and the pin support bearings 116 not only by the self-weight or a flow of a liquid, but also by a pressure without any separate power. That is, when the pin gear 100 is rotated by acceleration or deceleration of a driving source such as a motor connected to the pin gear 100, the lubricant flows toward the radially outer side of the lubricant supplying portion 230, that is, the end portion of a radial structure in which the cross section of the lubricant supplying portion 230 gradually decreases, due to a centrifugal force. The flow of the lubricant is accelerated due to the characteristic of a liquid that pressure increases as volume decreases (pv=k). A pressure generated at this time may supply the lubricant to the pins 110 and the pin support bearings 116.

In particular, in the present embodiment, since the pins 110 performing a rolling motion makes a complete circular motion, the lubricant may circulate toward the pin support bearings 116 where lubrication is necessary while a dry operation may be performed in a portion where lubrication is not needed, thereby leading an effective lubrication.

In the present embodiment, the lubricant supplying unit 200 further includes a plurality of balls 240 having a relatively larger size than the lubricant ejection hole 220 and arranged at both end portions of each of the pins 110.

The balls 240 may be manufactured of a steel ball and may reduce a frictional area of each of the pins 110 and a blocking phenomenon of the pin support bearings 116 at both end portions of each of the pins 110 when the balls 240 fall due to the self-weight of each of the pins 110. For reference, in a related art, it has been problematic that a deterioration phenomenon occurs during a long time use or a high speed operation or an amount of a lubricant decreases due to efflorescence of the lubricant. In the present embodiment, since the balls 240 are further provided, heat generation is reduced and efficiency is improved.

In the configuration as above, when a motor (not shown) is connected to the pin gear 100 to perform a rotational motion, the tooth gear 300 engaged with the pin gear 100 performs a linear motion. When the pin gear 100 performs a rotational motion, the lubricant concentrates on the radially outer side of the lubricant supplying portion 230, that is, the end portion of the radial structure in which the cross-section thereof is gradually decreased, due to a centrifugal force. As such, the lubricant may be supplied to the pins 110 and the pin support bearings 116 by a pressure generated as the flow of the lubricant is accelerated.

The lubricant supplied to the lubricant storage 210 in each of the pins 110 is ejected through the lubricant ejection hole 220 during the rolling motion of the pins 110 so as to assist lubrication of a rolling surface of each of the pins 110.

Thus, according to the present embodiment, the occurrence of problems such as adherence of external dust and efflorescence of a lubricant due to regular application of the lubricant is reduced, and in particular, as opposed to the related art, a lubricant coating work is made easy because the lubricant can be self-supplied to the pins 110 provided on the pin gear 100.

Figure 3:
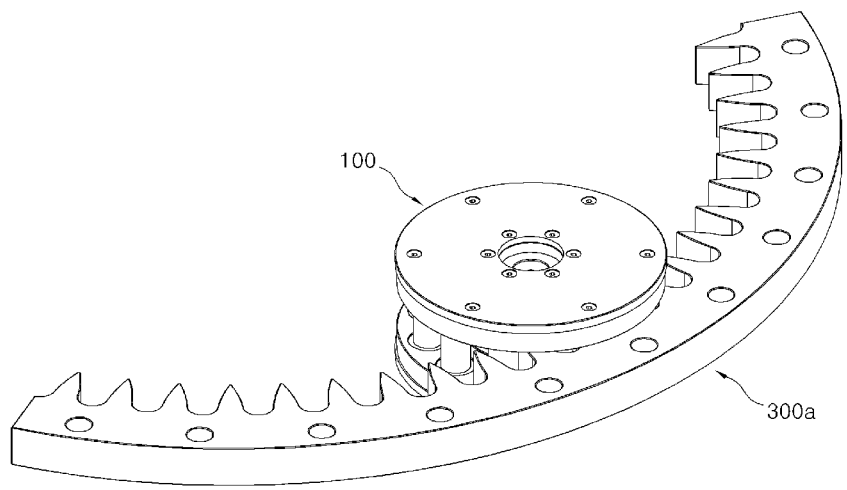
FIG. 3 is a perspective view of a power transmitting apparatus according a second embodiment of the present invention.
Figure 4:
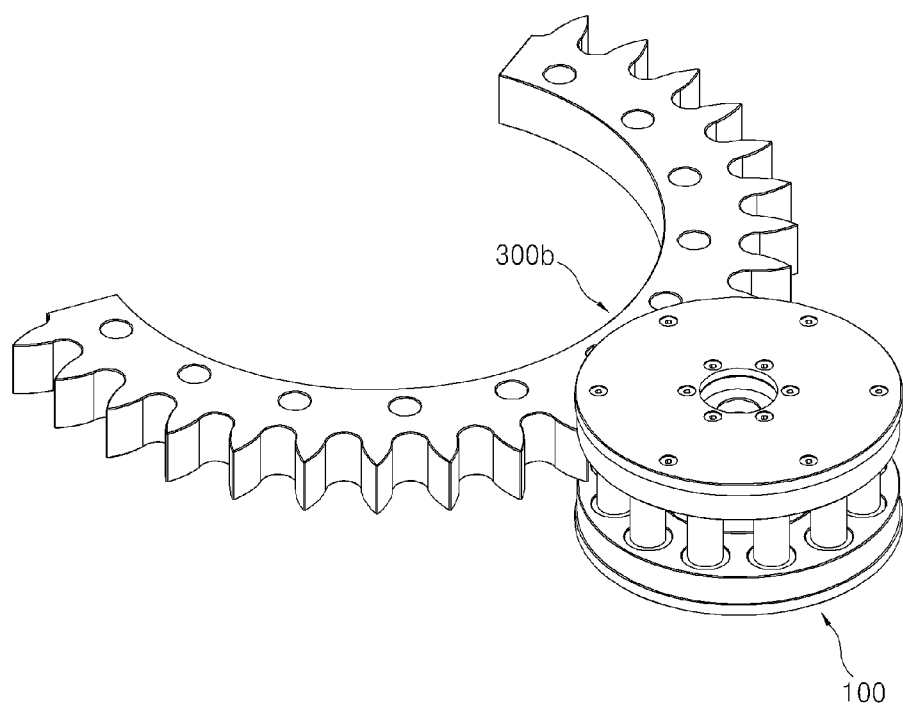
FIG. 4 is a perspective view of a power transmitting apparatus according a third embodiment of the present invention.

FIG. 3 is a perspective view of a power transmitting apparatus according a second embodiment of the present invention. FIG. 4 is a perspective view of a power transmitting apparatus according a third embodiment of the present invention.

In the second and third embodiments, like in the first embodiment, the pin gear 100 is a pinion-type driving gear and tooth gears 300a and 300b are rack-type driven gears. However, in the second and third embodiments, the tooth gears 300a and 300b have a curved shape unlike the above-described embodiment.

In FIG. 3, the tooth gear 300a having a curved shape is inscribed on the pin gear 100. In FIG. 4, the tooth gear 300b having a curved shape is circumscribed on the pin gear 100. In these cases, as the pin gear 100 to which a motor (not shown) is connected performs a rotational motion, the tooth gears 300a and 300b engaged with the pin gear 100 performs a linear motion, thereby forming a power transmitting system.

Even in the structures of FIGS. 3 and 4, when the lubricant supplying unit 200 of the first embodiment is applied to the pin gear 100, the occurrence of problems such as adherence of external dust and efflorescence of a lubricant due to regular application of the lubricant is reduced, and in particular, as opposed to the related art, a lubricant coating work is made easy because the lubricant can be self-supplied to the pins 110 provided on the pin gear 100.

Figure 5:
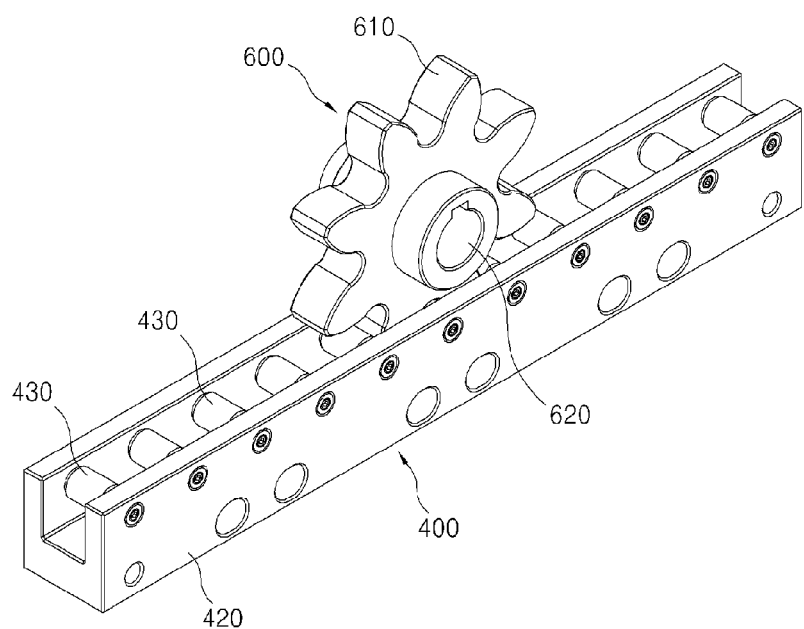
FIG. 5 is a perspective view of a power transmitting apparatus according a fourth embodiment of the present invention.
Figure 6:
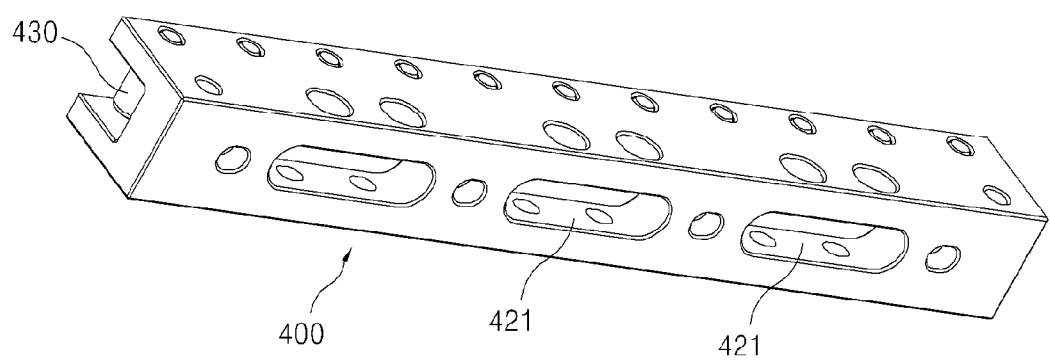
FIG. 6 is a perspective view illustrating a rear surface of the pin gear of FIG. 5.
Figure 7:
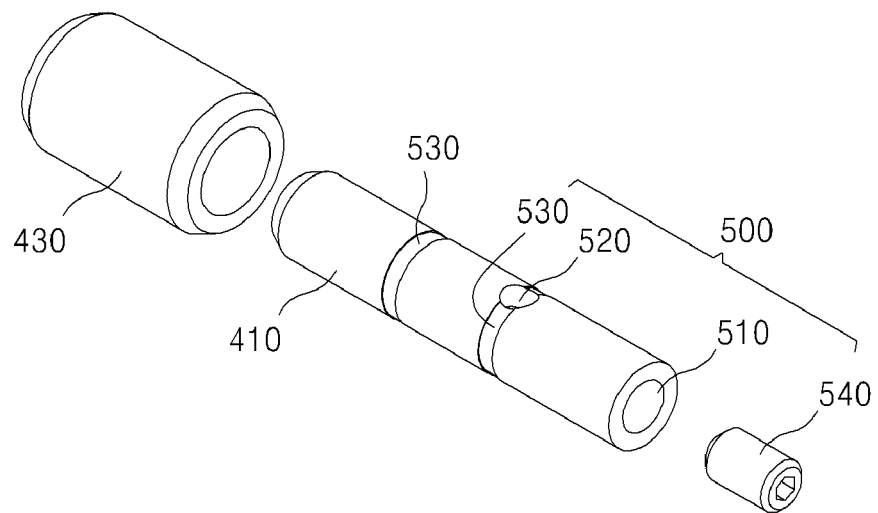
FIG. 7 is an exploded perspective view of a pin area in the pin gear of FIG. 5.
Figure 8:
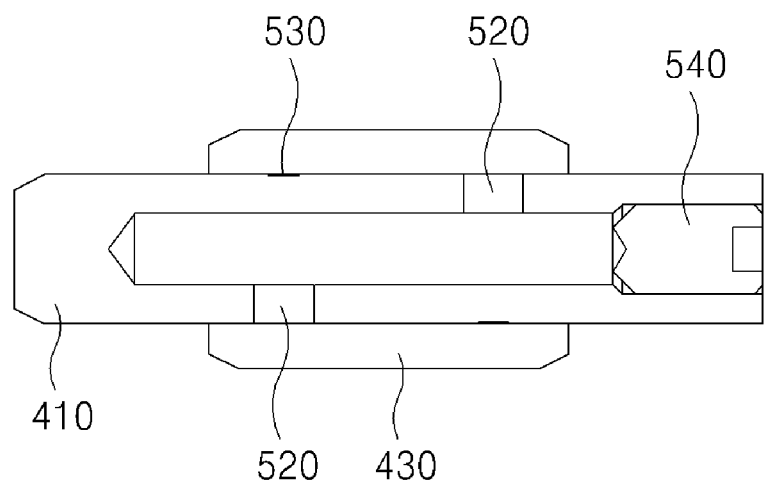
FIG. 8 is a cross-sectional view showing a coupling state of FIG. 7.

FIG. 5 is a perspective view of a power transmitting apparatus according a fourth embodiment of the present invention. FIG. 6 is a perspective view illustrating a rear surface of the pin gear of FIG. 5. FIG. 7 is an exploded perspective view of a pin area in the pin gear of FIG. 5. FIG. 8 is a cross-sectional view showing a coupling state of FIG. 7.

Referring to FIGS. 5-8, the power transmitting apparatus according to the present embodiment includes a pin gear 400 having a plurality of pins 410 capable of performing a rolling motion, a tooth gear 600 having a plurality of teeth 610 and engaged with the pin gear 400 to be capable of relatively moving, and a lubricant supplying unit 500 provided in the pin gear 400 to supply a lubricant to the pins 410.

In the present embodiment, the pin gear 400 is a rack-type driven gear and the tooth gear 600 is a pinion-type driving gear. That is, as a central non-circular boss groove 620 of the tooth gear 600, to which a motor (not shown) is connected, performs a rotational motion, the pin gear 400 engaged with the tooth gear 600 performs a linear motion, thereby forming a power transmitting system. However, the right scope of the present invention is not limited thereto and a reverse case may be available.

In the present embodiment, since the pin gear 400 is a rack-type driven gear, consideration of another aspect different from the above-described first embodiment is needed. Although the same structure as that of the first embodiment may be applied to the present embodiment, since the number of the pins 410 is large, if bearings are applied to all of the pins 410, manufacturing costs are increased. Thus, the following structure is applied to the present embodiment.

In the present embodiment, the pin gear 400 includes a gear main body 420 to which the pins 410 are linearly coupled at an equal interval, and a bushing 430 coupled to the outside of each of the pins 410. The gear main body 420 has a rectangular block structure. An elongated through hole 421 is formed in a lower portion of the gear main body 420. The bushing 430 is coupled to the outside of each of the pins 410 and is a portion that is actually and interactively engaged with the teeth 610 of the tooth gear 600.

As such, since in the present embodiment the driven gear has a lower rotational speed than the driving gear and the rotation frequency of each bushing 430 is remarkably low, an engaged rotational motion means is replaced by the bushing structure instead of the pin support bearings 116 (see FIG. 2) of the first embodiment. That is, the pins 410 form a support structure and the bushing 430 capable of rotating in a circumferential direction is installed around each of the pins 410.

Yet, if such a structure is in use, starting friction of the pin gear 400 may be increased when the engagement of the pin gear 400 and the tooth gear 600 begins. Accordingly, the lubricant supplying unit 500 is provided to facilitate a smooth rotation of the bushing 430 so that the starting friction may be reduced.

The lubricant supplying unit 500, as illustrated in FIGS. 7 and 8, includes a lubricant storage 510 provided in each of the pins 410 and storing a lubricant, a lubricant ejection hole 520 formed in an outer surface of each of the pins 510 to eject the lubricant in the lubricant storage 510 to the outside between each of the pins 410 and the bushing 430, and a cap 540 detachably coupled to an opening portion at one side of the lubricant storage 510.

As described above, the lubricant storage 510 refers to an inner space of each of the pins 410 for storing the lubricant. Accordingly, the lubricant storage 510 may be the inner space of each of the pins 410 or have a separate pouch shape separately provided in the inner space of each of the pins 410 to store the lubricant.

The lubricant ejection hole 520 ejects the lubricant from the lubricant storage 510 to the outside between each of the pins 410 and the bushing 430.

To improve efficiency in ejection of the lubricant, the lubricant supplying unit 500 according to the present embodiment further includes a lubricant groove 530 that is radially and inwardly formed in an area where the lubricant ejection hole 520 is formed along a circumferential direction of each of the pins 410. In the present embodiment, the lubricant groove 530 is formed in the form of two lines. The lubricant ejected through the lubricant ejection hole 520 flows along the lubricant groove 530 and thus supplied between each of the pins 410 and the bushing 430, thereby improving an efficiency of lubrication.

As in the present embodiment, when the lubricant is supplied between each of the pins 410 and the bushing 430 by the lubricant supplying unit 500 after the bushing 430 is coupled to the outside of each of the pins 410, the problem occurring in an existing case of a rack and pinion, that is, as the lubricant is directly exposed to a surface, external dust or foreign materials fall on the surface so as to adhere on the power transmitting apparatus such as a surface of a tooth due to the viscosity of the lubricant, may be solved. According to the present embodiment, the lubricant is not directly exposed to the outside and exists only between each of the pins 410 and the bushing 430 so that the bushing 430 regularly rotates while functioning as a natural dust-proof layer.

In the present embodiment, however, although not pressure-ejected as in the first embodiment, the lubricant may be naturally coated between each of the pins 410 and the bushing 430 during the rolling motion of the pins 410, thereby sufficiently contributing to the lubrication. For reference, the cap 540 coupled to one side of each of the pins 410 is a portion sealed after the lubricant is filled and functions as a pull tab for removing the pins 410 when the pin gear 400 is partially damaged or for maintenance and repair.

In particular, the structure of the present embodiment may be applied to that of the first embodiment. When the present structure is applied to the first embodiment, cost reduction is achieved and dust absorption, stack reduction, and weigh reduction may be possible.

Figure 9:
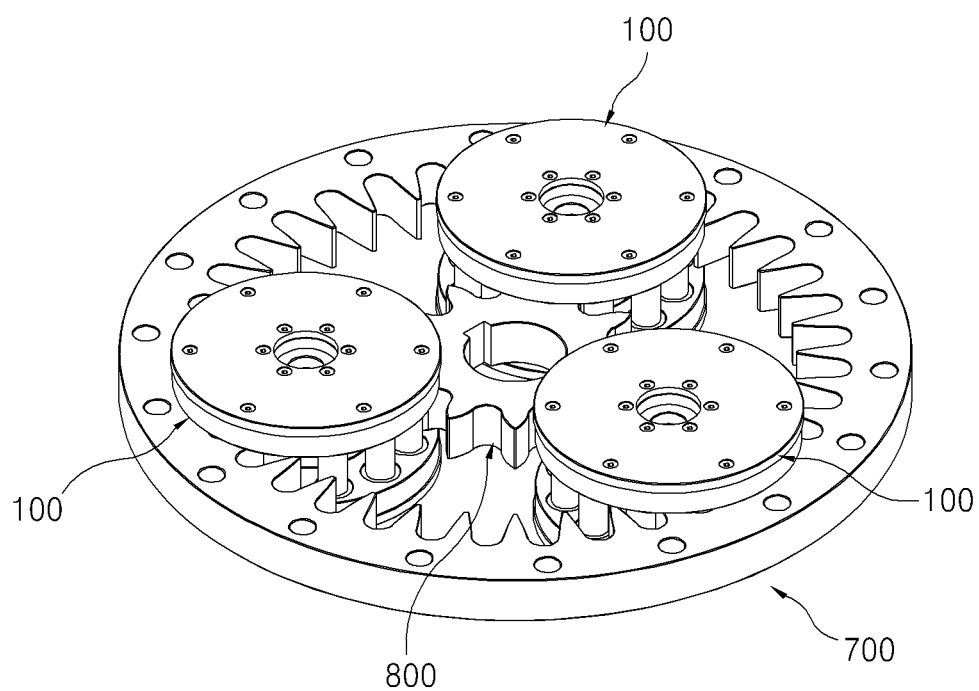
FIG. 9 is a perspective view of a power transmitting apparatus according a fifth embodiment of the present invention.
Figure 10:
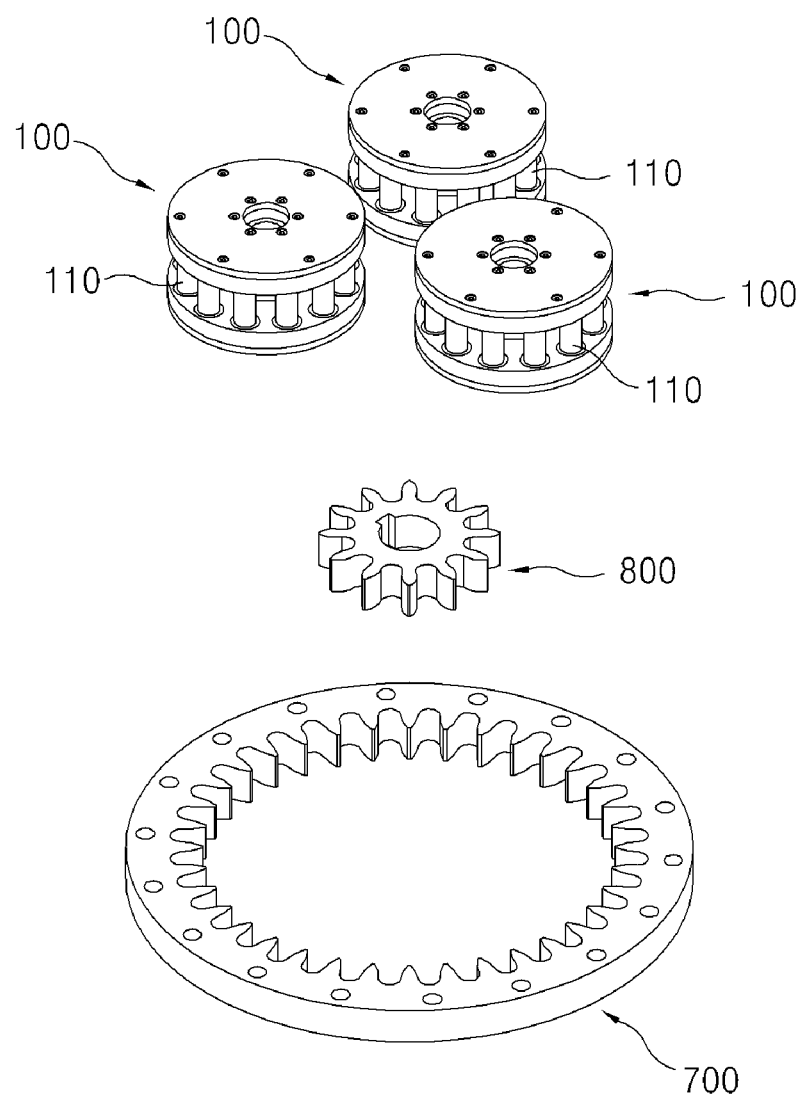
FIG. 10 is an exploded perspective view of the power transmitting apparatus of FIG. 9.

FIG. 9 is a perspective view of a power transmitting apparatus according a fifth embodiment of the present invention. FIG. 10 is an exploded perspective view of the power transmitting apparatus of FIG. 9.

The power transmitting apparatus according to the present embodiment may include a plurality of pin gears 100, each having a plurality of pins 110 capable of performing a rolling motion, a first tooth gear 700 arranged outside the pin gears 100 and on which the pins 110 of the pin gears 100 are inscribed, and a second tooth gear 800 arranged inside the first tooth gear 700 and on which the pins 110 of the pin gears 100 are circumscribed. In this structure, a lubricant supplying unit (not shown) for supplying a lubricant to the pins 110 is provided on each of the pin gears 100.

Any of the lubricant supplying unit 200 of the first embodiment and the lubricant supplying unit 500 of the fourth embodiment may be used as the lubricant supplying unit of the present embodiment.

In this embodiment, a planetary gear structure that is generally used is combined with the first embodiment, thereby embodying a lubrication-free planetary gear.

In the application of the structure of the first embodiment to a planetary gear or a coupled planetary gear group, an arrangement order of the pin gears 100 and the first and second tooth gears 700 and 800 is important. This is because, when the pin gears 100 are circumscribed on the second tooth gear 800, the shape of a tooth of the second tooth gear 800 is an epicycloid or an epitrochoid. When the pin gears 100 are inscribed on the first tooth gear 700, the shape of a tooth of the first tooth gear 800 is a hypocycloid or a hypotrochoid. Accordingly, even when the first and second tooth gears 700 and 800 are engaged with the same pin gears 100, the shapes of teeth of the first and second tooth gears 700 and 800 need to be completely changed. This is a big difference between a cycloid tooth shape and an involute tooth shape. That is, it is a characteristic of a cycloid-based tooth shape that the tooth shape varies according to the diameter of a gear even if a module and a tooth shape are identical to each other.

In this embodiment, a gear arrangement according to the application of a planetary gear in consideration of the cycloid tooth shape characteristic is shown below.

For a simple planetary gear, an epicycloid or epitrochoid tooth shape is applied to an input axis (sun gear), a pin gear is used as a planetary gear, and a hypocycloid or a hypotrochoid tooth shape is applied to an internal gear. That may be included in a planetary gear power transmitting apparatus by means of completely different tooth shapes, that is, a pin gear. Yet, the other arrangements may be very difficult to be actually embodied due to the increased number of parts, increased assembly difficulty, etc.

In contrast, a coupled planetary gear may be arranged in the following four ways.

In the first arrangement, a pin gear is used as an input axis (sun gear), an epicycloid or epitrochoid tooth shape is applied to a first step planetary gear, a pin gear is used as a second step planetary gear that is fixed to the first step planetary gear, and a hypocycloid or a hypotrochoid tooth shape is applied to a second step internal gear.

In the second arrangement, an epicycloid or epitrochoid tooth shape is applied to an input axis (sun gear), a pin gear is used as a first step planetary gear, a pin gear is used as a second step planetary gear that is fixed to the first step planetary gear, and a hypocycloid or a hypotrochoid tooth shape is applied to a second step internal gear.

The above-described two arrangements may be considered when the planetary gear is not relatively large. That is, the two arrangements may be taken into consideration when processing of a tooth of an internal gear is not difficult in view of a process or costs.

However, when an internal gear is configured of a pin gear because the internal gear is large, the following third arrangement may be taken into consideration.

In the third arrangement, a pin gear is used as an input axis (sun gear), an epicycloid or epitrochoid tooth shape is applied to a first step planetary gear, a hypocycloid or a hypotrochoid tooth shape is applied to a second step planetary gear that is fixed to the first step planetary gear, and a pin gear is used as a second step internal gear.

In the fourth arrangement, an epicycloid or epitrochoid tooth shape is applied to an input axis (sun gear), a pin gear is used as a first step planetary gear, a hypocycloid or a hypotrochoid tooth shape is applied to a second step planetary gear that is fixed to the first step planetary gear, and a pin gear is used as a second step internal gear.

In the embodiment of the above four arrangements of a coupled planetary gear, when the diameter of an input axis (sun gear) decreases because a relatively high deceleration ratio is needed, a spatial limit of the sun gear may be reduced. However, when a high speed rotation is needed, a tooth gear may be preferably arranged as an input gear.

As described above, according to the present invention, the occurrence of problems such as adherence of external dust and efflorescence of a lubricant due to regular application of the lubricant is reduced, and in particular, as opposed to the related art, a lubricant coating work is made easy because the lubricant can be self-supplied to a plurality of pins provided on a pin gear.

According to the present invention, by regularly applying a lubricant, the occurrence of problems such as the adherence of external dust and the efflorescence of the lubricant can be reduced, and in particular, because lubricant can be self-supplied to the plurality of pins provided on the pin gear, as opposed to the prior art, the task of applying a lubricant can be easily performed.

[Industrial Applicability]

The present invention may be used for a variety of fields, for example, vehicles, ships, mechanical machining, general machining, etc., where a power transmitting system for converting a rotational motion to a linear motion or a linear motor to a rotational motion is needed.

The invention claimed is:

1. A power transmitting apparatus, comprising:
a pin gear provided with a plurality of pins, the pins performing a rolling motion;
a tooth gear provided with a plurality of teeth and engagingly coupled to the pin gear so as to be relatively movable; and
a lubricant supplying unit provided on the pin gear to supply a lubricant to the pins, wherein the lubricant supplying unit comprises: a lubricant storage provided inside each of the pins and storing a lubricant; and a lubricant ejection hole formed in a lateral surface of each of the pins to communicate with the lubricant storage and ejecting the lubricant from the lubricant storage to outside each of the pins.

2. The power transmitting apparatus of claim 1, wherein the pin gear is a pinion-type driving gear and the tooth gear is a rack-type driven gear.

3. The power transmitting apparatus of claim 2, wherein the pin gear comprises:
first and second circular plates arranged separated from and parallel to each other, with the pins provided therebetween at the same interval in a circumferential direction;
first and second circular caps respectively coupled to exposed surfaces of the first and second circular plates; and
a plurality of coupling members coupling the first and second circular caps and the first and second circular plates.

4. The power transmitting apparatus of claim 3, wherein the pin gear further comprises a plurality of pin support bearings coupled to the first and second circular plates and supporting both end portions of each of the pins so as to perform the rolling motion.

5. The power transmitting apparatus of claim 3, wherein the lubricant supplying unit further comprises:
a lubricant supplying portion provided in any one of the first and second circular caps and supplying the lubricant to the lubricant storage of the pin.

6. The power transmitting apparatus of claim 5, wherein the lubricant supplying portion is formed in a concave form in an inner surface of the any one circular cap and has a radial structure in which a cross section thereof is gradually decreased toward the outside in a radial direction.

7. The power transmitting apparatus of claim 5, wherein the lubricant ejection hole is provided at two positions symmetrically in the pin in a lengthwise direction.

8. The power transmitting apparatus of claim 5, wherein the lubricant supplying unit further comprises a plurality of balls having a size relatively larger than the lubricant ejection hole and arranged at both end portions of the pin to reduce a frictional area of the pin.

9. The power transmitting apparatus of claim 2, wherein the tooth gear has a curved shape and the pin gear is partially inscribed or circumscribed on the tooth gear.

10. The power transmitting apparatus of claim 1, wherein the pin gear is a rack-type driven gear and the tooth gear is a pinion-type driving gear.

11. The power transmitting apparatus of claim 10, wherein the pin gear comprises:
a gear main body to which the plurality of pins are linearly coupled at an equal interval; and
a bushing coupled to the outside of each of the plurality of pins.

12. The power transmitting apparatus of claim 11, wherein the lubricant supplying unit further comprises a lubricant groove radially and inwardly formed in an area where the lubricant ejection hole is formed along a circumferential direction of each of the pins.

13. The power transmitting apparatus of claim 11, wherein the lubricant supplying unit further comprises a cap detachably coupled to an opening portion at one side of the lubricant storage.

14. A power transmitting apparatus, comprising:
a plurality of pin gears, each pin gear comprising a plurality of pins performing a rolling motion;
a first tooth gear arranged outside the plurality of pin gears and on which the pins of the pin gears are inscribed;
a second tooth gear arranged inside the first tooth gear and on which the pins of the pin gears are circumscribed; and
a lubricant supplying unit provided on the pin gears to supply a lubricant to the pins, wherein the lubricant supplying unit comprises: a lubricant storage provided inside each of the pins and storing a lubricant; and a lubricant ejection hole formed in a lateral surface of each of the pins to communicate with the lubricant storage and ejecting the lubricant from the lubricant storage to outside each of the pins.

* * * * *